(12) United States Patent
Andersen et al.

(10) Patent No.: US 6,641,330 B1
(45) Date of Patent: Nov. 4, 2003

(54) METHOD AND APPARATUS FOR LAYING ELONGATED ARTICLES

(75) Inventors: Stig Jarle Andersen, Stavanger (NO); Øivind Stangeland, Sandnes (NO)

(73) Assignee: Stolt Offshore AS, Stavanger (NO)

( * ) Notice: Subject to any disclaimer, the term of this patent is extended or adjusted under 35 U.S.C. 154(b) by 0 days.

(21) Appl. No.: 09/649,786

(22) Filed: Aug. 29, 2000

(30) Foreign Application Priority Data

Oct. 21, 1999 (GB) .............................. 9924901

(51) Int. Cl.⁷ .............................. F16L 1/20; F16L 1/26
(52) U.S. Cl. .............................. 405/166; 156/456
(58) Field of Search .................. 242/448.1; 57/15; 156/443, 446, 448, 449, 456–458, 555; 405/154.1, 158, 162, 165, 166, 168.3, 168.4

(56) References Cited

U.S. PATENT DOCUMENTS

| | | | | |
|---|---|---|---|---|
| 2,070,925 A | * | 2/1937 | Rolfs et al. | 242/439.5 |
| 2,359,751 A | * | 10/1944 | Cummings et al. | 156/392 |
| 2,370,254 A | * | 2/1945 | Mickelson | 242/439.5 |
| 2,471,580 A | * | 5/1949 | Perrault et al. | 156/392 |
| 2,770,284 A | * | 11/1956 | Myrick | 156/392 |
| 3,190,780 A | * | 6/1965 | McNulty et al. | 156/162 |
| 3,269,422 A | * | 8/1966 | Matthews et al. | 138/111 |
| 3,400,737 A | * | 9/1968 | Matthews et al. | 138/111 |
| 3,680,342 A | * | 8/1972 | Mott et al. | 405/168.1 X |
| 4,069,088 A | * | 1/1978 | Cottam | 156/392 X |
| 4,330,811 A | * | 5/1982 | Bordner | 361/212 |
| 4,426,834 A | * | 1/1984 | Dokmo et al. | 242/441.3 |
| 4,461,429 A | * | 7/1984 | Goekler et al. | 242/439.5 |
| 4,510,348 A | * | 4/1985 | Arroyo et al. | 174/121 A |
| 4,511,001 A | * | 4/1985 | Wu | 166/310 |
| 4,558,971 A | | 12/1985 | David | 405/158 |
| 4,659,253 A | * | 4/1987 | Jacobson | 405/158 X |
| 4,843,713 A | * | 7/1989 | Langner et al. | 57/6 |
| 5,273,611 A | * | 12/1993 | Webb et al. | 156/392 |
| 5,491,880 A | * | 2/1996 | Labiche | 156/392 X |
| 5,689,601 A | * | 11/1997 | Hager et al. | 385/100 |
| 5,736,211 A | * | 4/1998 | Fontanilla | 428/40.1 |
| 6,293,732 B1 | * | 9/2001 | Baugh | 405/166 |

FOREIGN PATENT DOCUMENTS

| | | | |
|---|---|---|---|
| EP | 0574060 A1 | | 12/1993 |
| FR | 2116911 A | | 7/1972 |
| GB | 838070 | * | 6/1960 |
| GB | 923816 | * | 4/1963 |
| GB | 1160508 | * | 8/1969 |
| GB | 1210206 | * | 10/1970 |
| GB | 2303896 A | | 3/1997 |
| WO | WO 95/12087 A1 | | 5/1995 |

\* cited by examiner

Primary Examiner—Robert E. Pezzuto
Assistant Examiner—Tara L. Mayo
(74) Attorney, Agent, or Firm—Sheridan Ross P.C.

(57) ABSTRACT

Fiber reinforced flexible adhesive tape is used to bind an elongate article or bundle of articles during subsea laying operations and apparatus for laying the elongate articles. The apparatus includes at least one carrier for a tape spool arranged to rotate while moving bodily around the axis of the article during laying.

25 Claims, 6 Drawing Sheets

METHOD AND APPARATUS FOR LAYING ELONGATED ARTICLES

FIELD OF THE INVENTION

The invention relates to methods of laying elongate articles in sub-sea applications, and in particular to methods of laying multiple articles such as pipes or cables in parallel, and strapping them together in the process.

The invention further relates to an apparatus for use in such methods, and, in particular, to an automated strapping system for continuously strapping at least two lines together.

DESCRIPTION OF THE RELATED ART

As the offshore industry moves into deeper waters and marginal field developments, there is a constant drive to reduce costs through introduction of improved technology. These field oil development projects are using floating production units such as ships and semi-submersible rigs often combined with subsea tiebacks.

In subsea installations, flowlines, risers including service and injection lines connect subsea wells to the processing facilities. These pipes are configured in individual, "piggyback", umbilical or other modes. As the field developments move into deeper waters, the oil industry needs to develop products and systems accordingly. Spoolable composite pipes offer products with technical and economical potential in static and dynamic systems for deep-water subsea tiebacks. Especially promising are composites used in dynamic umbilicals and risers.

While piggyback installations are well known, for example where a methanol service line is laid simultaneously with a larger diameter oil or gas production line. In other applications, hydraulic and/or electrical service lines may be included in such a bundle. The invention may further be applicable to the laying of electrical and optical cables, as opposed to conduits for fluids such as oil, gas and water.

It is known in such applications to bind two conduits together using typically a series of steel bands, of the general type widely used in packaging heavy goods for transport. These bands have traditionally been applied by hand, using a special-purpose tensioning and fastening device. Such methods limit the speed at which the pipe bundle can be laid. Moreover, delicate articles including modem continuous composite pipes and coated pipes, can be damaged by the hard-edged steel banding.

BRIEF SUMMARY OF THE INVENTION

The present invention in various aspects has the object of alleviating one or both of the above drawbacks in the prior art.

A first aspect of the invention comprises the use of a flexible adhesive tape to bind an elongate article or bundle of articles during sub-sea laying operations. Although the invention is intended primarily for binding two or more articles so as to keep them together and/or take the strain from or one or other of them, there may equally be applications, where a single article is being laid, for example, where the tape provides desirable properties as a coating for the article, or is used to bind a coating or sheath to the article.

The tape may for example comprise fibre reinforced plastic, for example glass fibre reinforced plastic tape. Such a tape is far less likely to damage delicate articles, being more compliant in shape than the convention steel bands.

The tape may be applied substantially continuously during laying, to form one or more helical windings. In a preferred embodiment, two helical tape windings are applied during laying, with opposite senses of rotation.

A second aspect of the invention provides an apparatus for laying elongate articles sub-sea, the apparatus including at least one carrier for a tape spool, arranged for the spool to rotate while moving bodily around the axis of the article during laying. Compared with conventional banding operations which have generally been performed at a horizontal section of pipe, embodiments of the invention provide an apparatus suitable for operation where the axis of the pipe or other article is vertical or substantially inclined, according to the desired angle of deployment beneath the sea surface.

The apparatus may in particular be mounted within a vertical or tiltable laying tower or "stinger", downstream of equipment which supports the weight of the article during paying out. The apparatus is thus suitable for "J-Lay" operations in deep water.

The apparatus may have more than one rotary spool carrier, for example to achieve the double helix mentioned above. Each spool carrier may be arranged for powered movement around the axis, or for movement by hand. Guide means may be provided between the spool and the axis of the article, for impinging on a non-adhesive surface of the tape, so as to guide it onto the article being laid. The spools themselves need not be driven, the tape being drawn automatically from the spools by the rotation of the spool carrier and by the axial progress of the article during laying.

In a preferred embodiment disclosed herein, the apparatus includes adjustable guides above and/or below the location of tape winding, in order to keep a bundle of articles together in a desired configuration during binding.

In the preferred embodiments disclosed herein, the guide means and the rotary arrangement of the spool carrier about the axis of the pipe bundle or other article to be laid are made openable, so that the apparatus can be positioned for operation around the axis of an article without the need to thread the end of that article through the apparatus as an initial step. The apparatus may be mounted permanently in a laying tower or other laying arrangement, to be retracted when not in use, and to be deployed about the axis of the article being laid as required.

BRIEF DESCRIPTION OF THE DRAWINGS

Embodiments of the invention will now be described, by way of example only, with reference to the accompanying drawings, in which.

DETAILED DESCRIPTION OF THE DRAWINGS

The present invention has been developed for use with composite pipes, in particular, spoolable composite pipes:

Typically, spoolable composite pipes are made up of a thermoplastic liner with a fibre reinforced matrix material wound on it. Glass, aramid and carbon fibre maybe used as reinforcing material. A typical matrix material is epoxy. However, other matrix materials can be used. The thermoplastic inner liner serves four purposes. It acts like a chemical barrier and pressure seal for the composite laminate. The latter is important since the pipe contains micro cracks from spooling. Further, the liner gives a low friction inner surface to the pipe. Finally, the liner acts as carrier during manufacturing.

The composite laminate is the load carrying structure for loads imposed during storage, transportation, installation and operation. The nature of the materials used in the laminate also results in excellent corrosion resistance of the pressure vessel.

High-pressure spoolable composite pipes are accepted as an alternative material to steel for this application. Based on this technical break through for the spoolable composite pipe technology, the likelihood of other developments like flowlines, dynamic service lines and composite coiled tubing being successfully developed and qualified are increasing. For these applications high-pressure composite pipe offer a potential solution for deep-water developments, service and operations.

The tool to be described is designed to enable the installation of pipes, wires, rods, umbilicals, risers etc flatpacked or piggybacked with two or more lines attached to each other in a fast and easy manner. The tool can be operated at any angle and with any size of pipes. It is a tool designed to continuously strap/hold two or more lines whether coated or uncoated lines, together to ensure that the lines can be installed parallel to each other. The strapping serves the purpose of transferring load and forces from one line to another line that is held back in a controlled manner by a tensioner or other means. The other line may be of composite type, or of more conventional flexible or rigid (steel) pipe.

The tool can be prepared for example for two lines to be piggybacked in a continuous manner using tape applied in a double helix. Suitable tape is a glass reinforced plastic tape of a type currently available for advanced applications from 3 m (Minnesota Mining and Manufacturing Corporation). 3 m data sheet number 8981 describes one suitable example. So far as the inventors are aware, such tapes have not been applied before in subsea operations. Conventionally, the longest rolls available have lengths of tens of metres at a time. For the present application, hundreds or even thousands of metres of tape will be desirable on a single roll.

Figure 1:
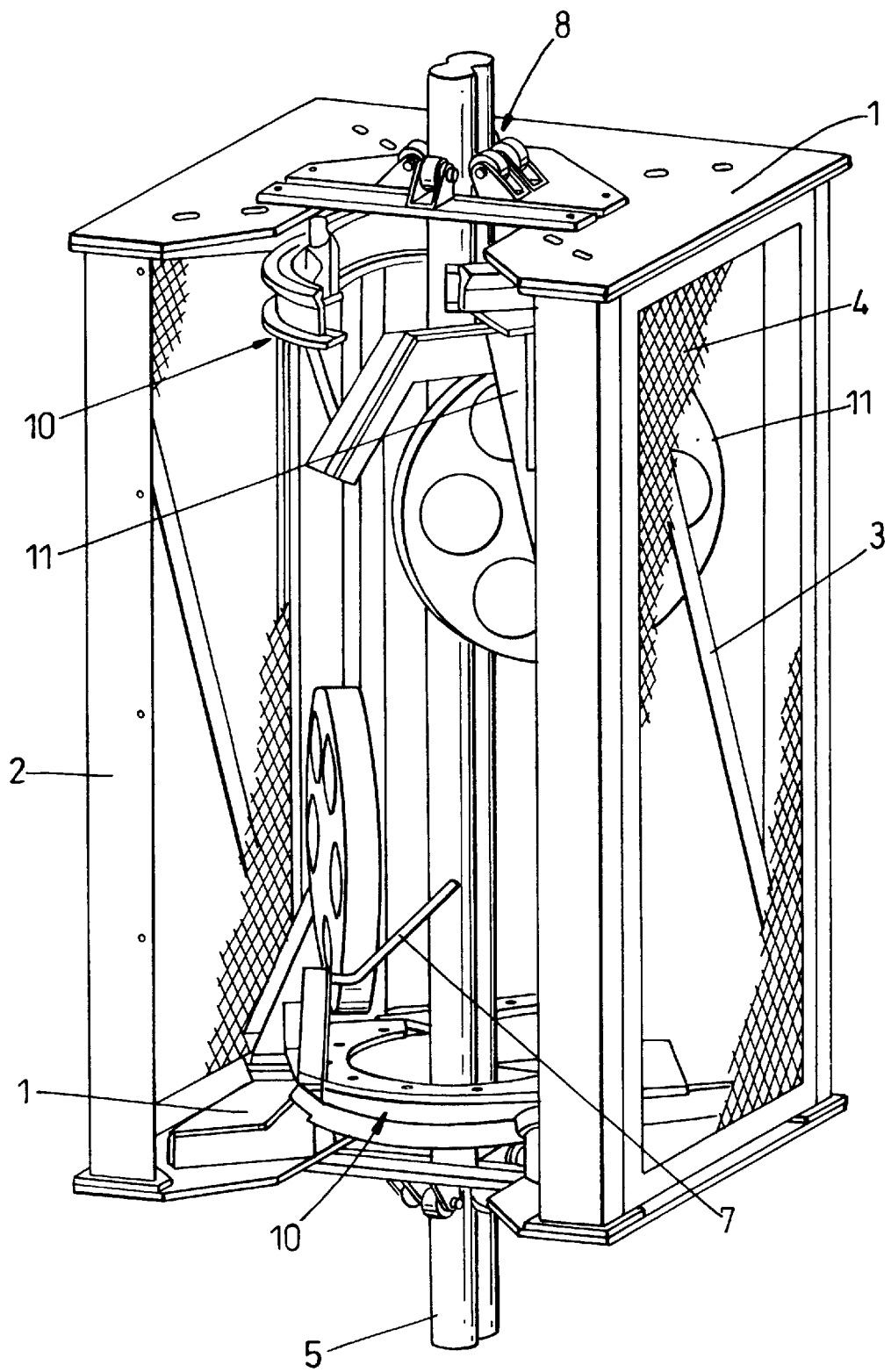
FIG. 1 is a view of an automated strapping system made in accordance with the present invention.
Figure 2:
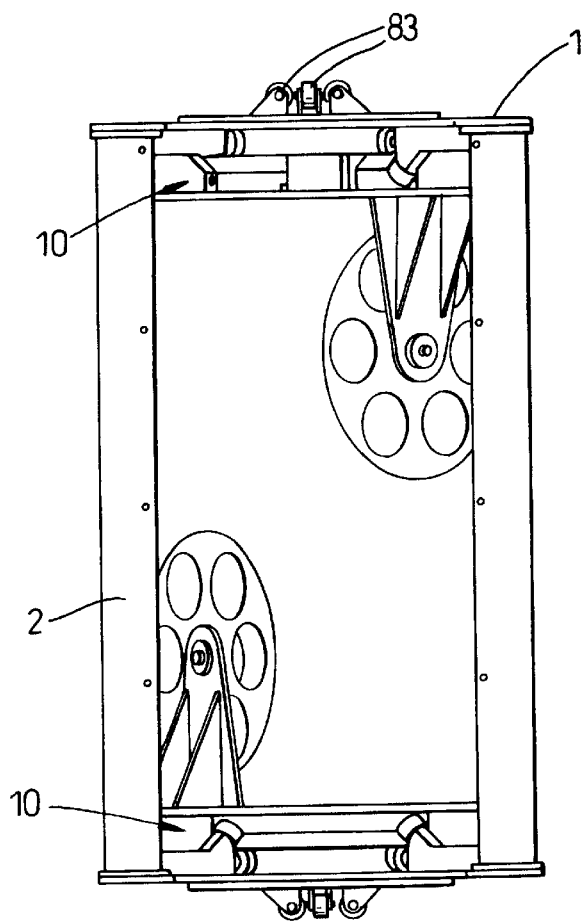
FIGS. 2 and 3 are elevation and plan views of the system shown in FIG. 1.
Figure 3:
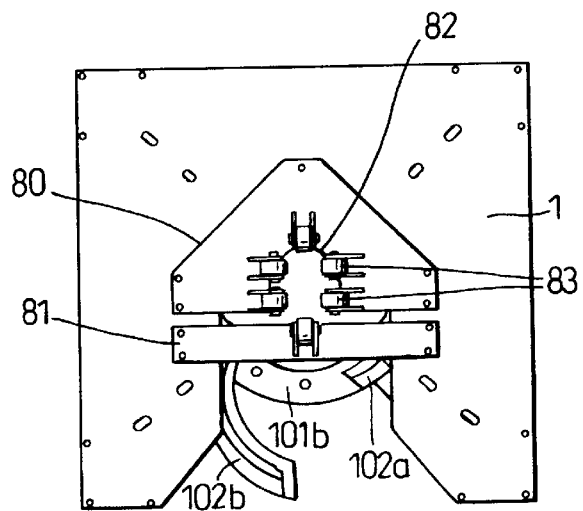

The novel tool is shown in general detail in FIGS. 1, 2 and 3 of the drawings and consists of a frame, two rotary tables 10 carrying tape spools 11 and tape guides 7, two pipe guides 8, two hydraulic motor drives 13 (not shown in FIGS. 1–3) and a control panel (not shown). The frame consists of two endplates 1 and four corner struts 2. Three sides of the frame are further provided with a diagonal cross bar 3 and a wire mesh facia 4, while the fourth side is open to allow the introduction of lines 5 which are to be to be strapped with adhesive tape.

Pipe guides 8 are provided on each of the end plates 1 of the.frame and are shown in FIGS. 1 and 3 of the drawings. Each pipe guide 8 consists of a base plate 80 having a slot 82, and a closing bar 81. The plate 80 is located over a cut away section in the end plate 1 of the frame so that the slot in the plate 80 is still open via the cut away section in the end plate 1.

The bar 81 is located over the end of the cut away section in the end plate 1 to form a hatch. Spaced around the opening are six guide rollers 83, two on each of the longer side one on the short side on the location plate and one in the location bar 81. The arrangement of the location bar 81 and location plate 80 provide a hatch for entry of the lines 5 to be strapped.

Figure 4:
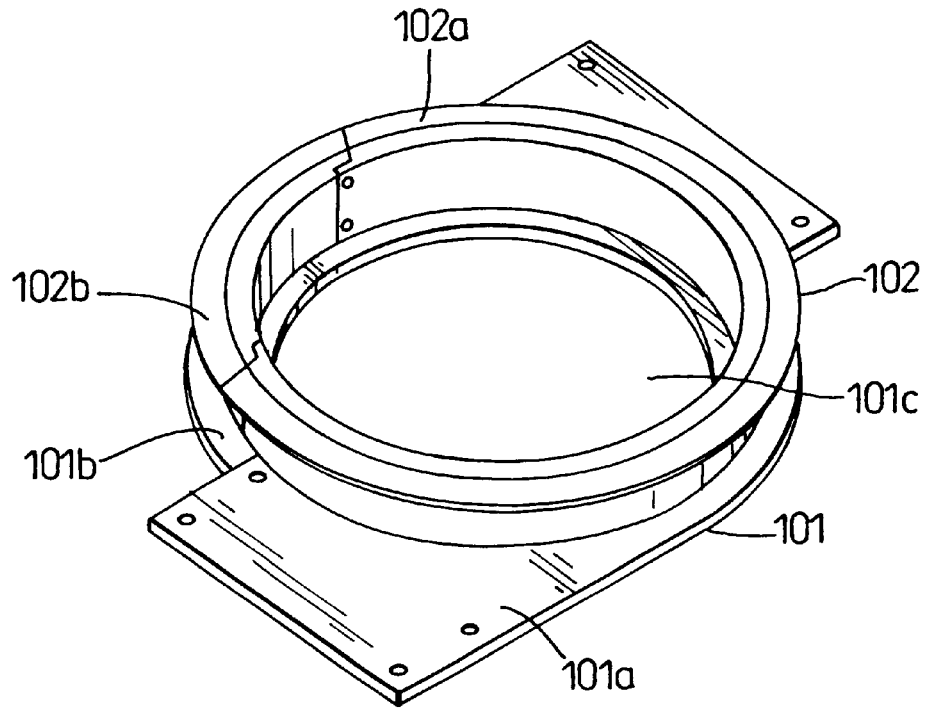
FIGS. 4 and 5 are more detailed views of the rotary table of the system shown in FIG. 1.
Figure 5:
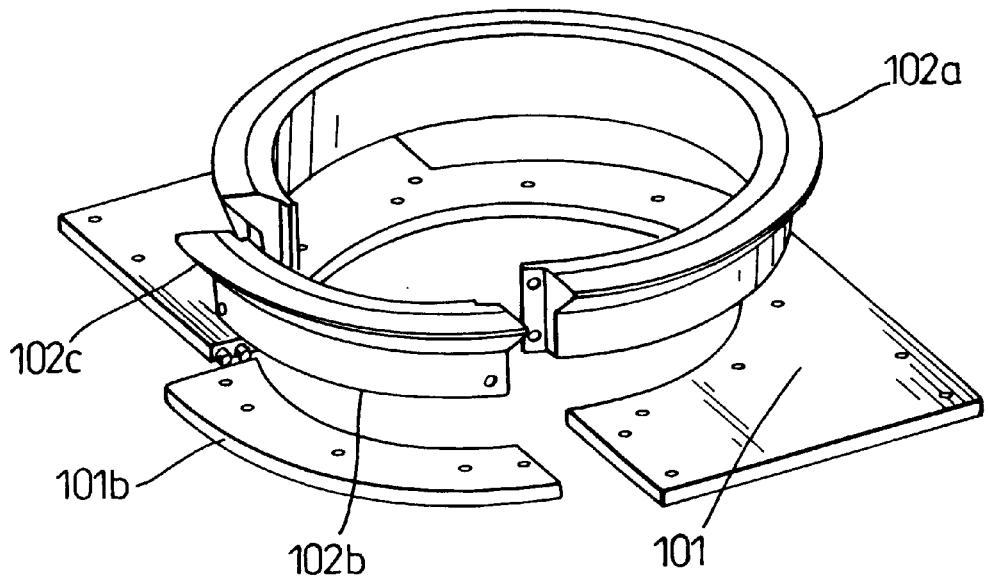

One rotary table 10 is shown in more detail in FIGS. 3 to 5 of the drawings and consists of a main plate 101, and a circular track formed by ring 102 mounted on the main plate 101. The main plate has a main section 101a and a removable arc section 101b fixed thereto. The main section 101a provides two generally rectangular corner portions for mounting tape spools, either side of a central aperture 101c. The ring 102 is formed with a fixed main section 102a and a removable arcuate section 102b corresponding to the removable section 101b of the main plate 101. The ring 102 is fitted to the mains plate 101 so that it extends around the aperture 101c and provides a conical flange 102c which extends outwardly at the end of the ring 102 away from the main plate 101.

Figure 6:
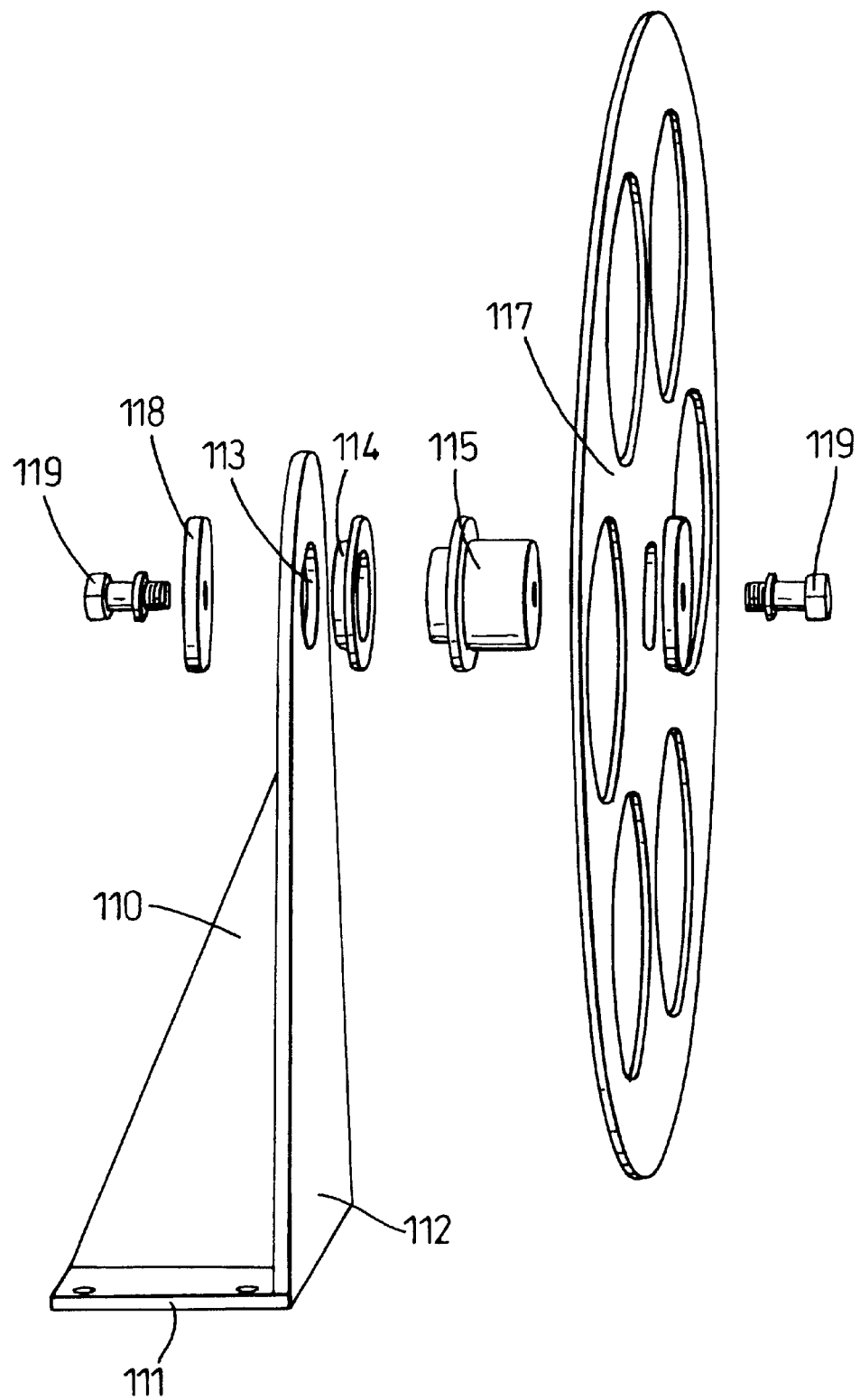
FIG. 6 is a detailed view of a tape spool of the system shown in FIG. 1.

One tape spool 11 is shown in greater detail in FIG. 6 of the drawings and is supported by a bracket 110 comprising a base plate 111 and a face plate 112 with an opening 113 at its end remote from the base plate 111. The bracket supports a bearing 114, a hub 115, a reel supporting wheel 117, a clamp 118 and two threaded axle components 119. When assembled the two axle components 119 are fixed through the components 114–118 and through the hole 113 to hold the components in place. It will be understood that by this mechanism reels of tape can be loaded and replaced onto the tape spool as required. The spool can rotate freely to payout the tape without being driven directly.

Figure 7:
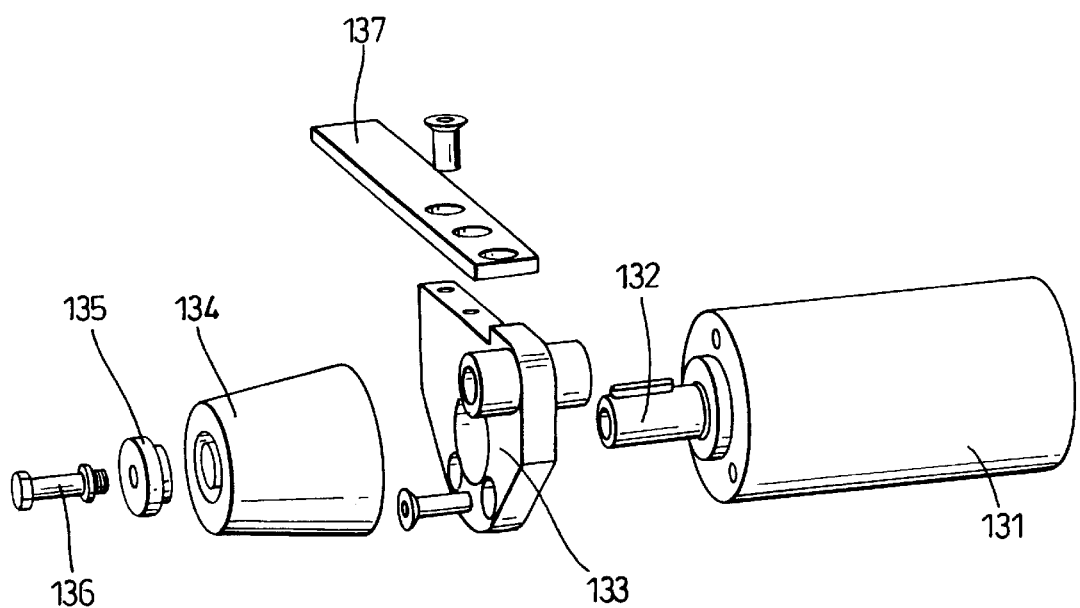
FIG. 7 is detailed view of the hydraulic motor drive unit shown in FIG. 1.

One hydraulic motor drive 13 is shown in detail in FIG. 7 of the drawings and consist of a hydraulic motor unit 131 having a keyed drive spindle 132, a bracket 133, a rubber drive wheel 134 which is conical in shape, retainer 135 and retaining bolt 136. A mounting plate 137 is provided for mounting the bracket and other components to the frame such that the drive wheel 134 engages the conical flange of the corresponding rotary table 10.

As shown in FIGS. 1 to 3, one of the rotary tables 10 is located near to each end plate 1 of the frame. Consequently, one of the rotary tables is placed "upside down" at the top of the machine and the other at the bottom. The lines to be wrapped (labelled 5 in FIG. 1) are led through the opening in the upper pipe guide 8 where the guide rollers 82, will gather the lines before tape is applied. One tape spool 11 and tape guide 7 is mounted upon each rotary table 10, although space is provided for two. Each rotary table is supported by four roller retainers which act against the conical flange 102c to form a bearing. Furthermore, each hydraulic motor drive 13 (not shown in FIGS. 1–3) is mounted on the corresponding end plate with its conical drive wheel 34 on the hydraulic motor 13 pressed against the conical flange 102c on the rotary table with an adjustable tension device (not shown).

The rotary table(s) may alternatively be provided with a chain drive.

When the machine is correctly placed and secured, two hydraulic lines from the control panel control can be connected to the main supply. Where PVG-valves are used for controlling the machine, it is necessary to pay attention to heating of the hydraulic oil. This will occur if the oil volume is small and the hydraulic power unit (HPU) is equipped with a fixed displacement pump. In this case an oil cooler is mounted (not shown).

In order to engage the machine around the pipelines the hatches (bar 81) in the upper and lower pipe guides 8 and the rotary tables 10 are opened. The bar 81 can be swung aside. In order to open the rotary table hatch the sections 101b and 102b the main plate 101 and ring 102 must be removed. The machine can now be entered onto the lines, and the hatches closed. When the line is in place, the upper and lower pipe guides 8 are adjusted. This is done by loosening the pipe guide rollers 83 on the top and bottom plate, and move it towards the pipe to eliminate play. Different configurations of rollers 83 and plates 80 and 81 can easily be provided for different applications, while the present illustration applies to a parallel laying of two similar diameter pipes.

The tape rolls (not shown) are mounted on the tape spools 11 in such a way that the tape comes off each roll, over the tape guide a 7 and onto the lines without any wrinkles etc. When mounting the tape rolls, cardboard shims between the tape and the clamp can be used to prevent the.clamp to glue to the tape. The tape guides themselves are simply angled bars of steel, which engage the non-adhesive side of the tape to bring it to the pipes 5 at the correct angle for wrinkle-free application.

Prior to the start of pipelaying operations, the hatches are closed and secured by bolts. Then, while the pipes 5 move axially in the laying direction, the operator opens hydraulic valves to start the rotation of the tables 10 about the pipe axis. If both rotary tables 10 are used (to achieve a double crossing helix of tape on the pipeline) the control panel is arranged such that both the valve handles are activated in the same direction, but causing the lower rotary table 10 to rotate in the opposite direction to the upper table. To adjust the taping angle on the pipelines, the speed of the rotary tables can be adjusted to suit the laying speed. By automating the strapping process, lay rates in excess of 600 m per hour are readily achieved, compared with a maximum of 150 m per hour achievable by manual techniques.

The rollers supporting the rotary tables 10 are mounted on roller retainers which can be adjusted to compensate for wearing etc. of the rollers.

In addition the machine can be adjusted to alter the configuration of the tape wind about the article or articles. In the case where the tape is being deployed to bind two or more elongate articles together the machine can be set so that the tape winds about the articles in an open spiral having sufficient pitch to hold the articles together. A similar type of arrangement can be used when binding a sheath to one or more lines. Alternatively, the machine can be used to wind the tape as a protective layer about one or more articles and in this arrangement the machine is adjusted so that the winding overlaps and provides a complete coverage over the article or articles as a whole.

In a typical installation of the apparatus of the present invention, subsea wells are tied back to surface facilities by a complex of flowlines, umbilicals and service lines. Spoolable composite pipes are used which can be strapped to an electro-hydraulic umbilical and in this type of installation can be bound together with flexible adhesive tape. An example of a suitable composite pipe is COMPIPE®. COMPIPE® is a static service and injection pipe, and specifically a glass fibre based composite pipe employing ADVANTEX® glass fibre from Owens Coming. The matrix material is epoxy hardened with a cycloalphatic ployamine hardener. Liner material is cross linked polyehtylene (PEX).

In a typical installation of the apparatus of the present invention, subsea wells are tied back to surface facilities by a complex of flowlines, umbilicals and service lines. Spoolable composite pipes are used which can be strapped to an electro-hydraulic umbilical and in this type of installation can be bound together with flexible adhesive tape. An example of a suitable composite pipe is COMPIPE@. COMPIPE@ is a static service and injection pipe, and specifically a glass fibre based composite pipe employing ADVANTEX@ glass fibre from Owens Corning. The matrix material is epoxy hardened with a cycloalphatic ployamine hardener. Liner material is cross-linked polyehtylene (PEX).

Figure 8:
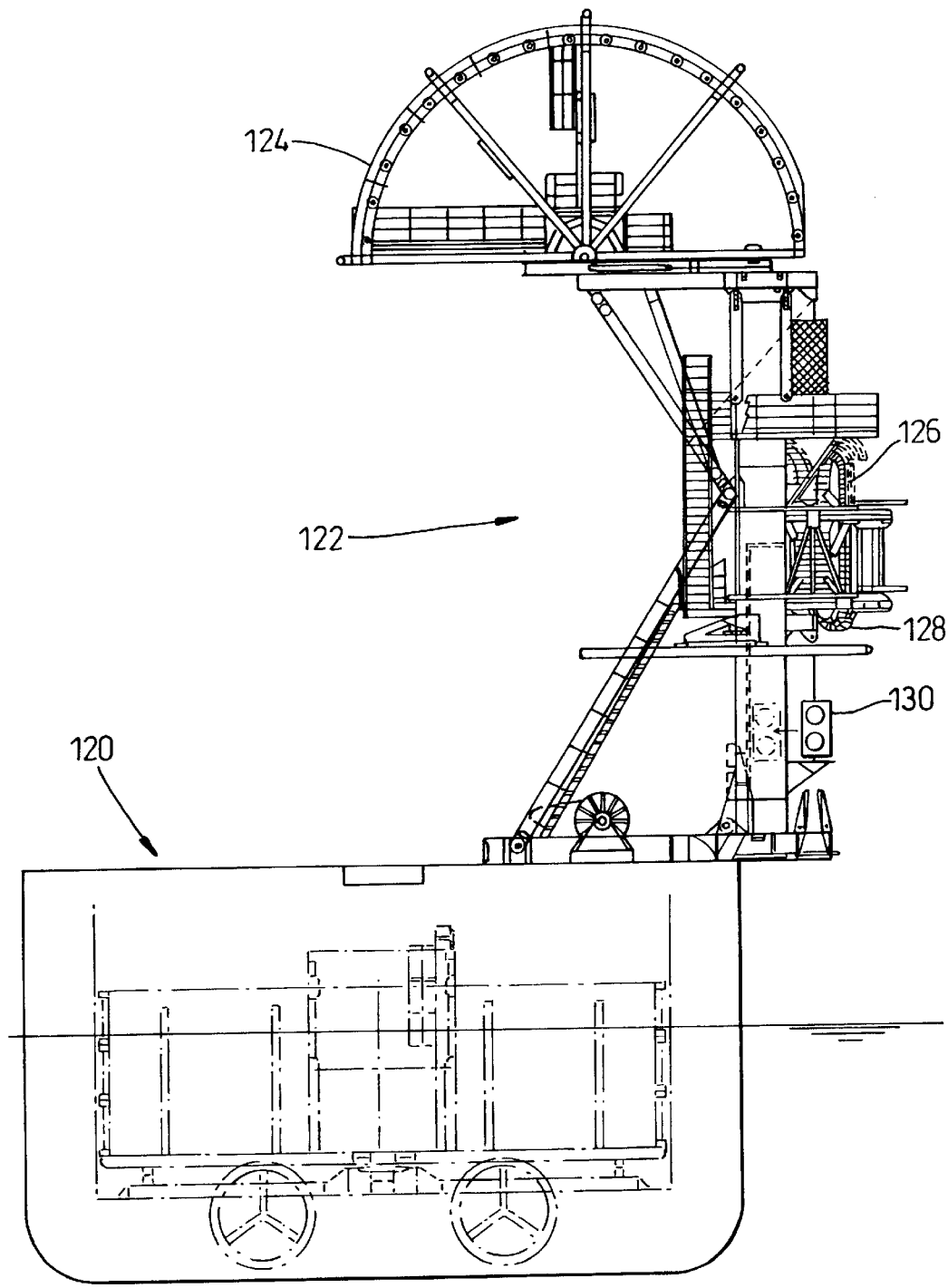
FIG. 8 is a side view of a vertical lay tower incorporating the system shown in FIG. 1.

FIG. 8 shows schematically a pipe laying vessel 120 incorporating a vertical lay tower 122, such as may be used for installation of umbilicals and service lines. The tower has two radius controlling chutes 124 (one only visible in this view) at the top to control the bending during installation and to enable piggyback installation of two pipes. A straightener 126 is located underneath the chutes, followed by a tensioner 128. The tensioner is used to control the installation rate and ensure the hold back tension in the service lines. The tape wrapping apparatus described above is then located at 130 to ensure continuous and safe strapping of the umbilical to the service line. The strapping apparatus 130 can be mounted permanently in the tower, while being retractable from the pipe axis when not required. Slides or cantilever arrangements can readily be envisaged for this purpose.

The purpose of the strapping in the above examples is to transfer the load of the umbilical to the service line and keep the lines together on the seabed until the lines are trenched. The skilled reader will readily envisage other applications and modifications of the techniques described herein, after consideration of the present disclosure. Accordingly, the invention is not to be considered as limited to these examples in any way.

What is claimed is:

1. A method of binding together a plurality of conduits during sub-sea laying, comprising the steps of:
   providing a sea-going vessel having equipment operatively connected to the vessel for laying conduits at sea;
   providing a plurality of conduits on the vessel;
   positioning the vessel at sea;
   paying out the plurality of conduits from the vessel using the equipment;
   binding the plurality of conduits together using an adhesive tape;
   laying the conduits in the sea by advancing the conduits from the vessel and the equipment.

2. A method as claimed in claim 1, wherein:
   the tape comprises a fiber reinforced plastic.

3. A method as claimed in claim 1, wherein:
   the tape is applied substantially continuously during said binding step to form a helical winding.

4. A method as claimed in claim 1, wherein:
   two helical tape windings of the tape are applied during said binding, the windings having opposite senses of rotation.

5. A method as claimed in claim 1, wherein:
   an axis of the conduits is vertical or substantially inclined, according to a desired angle of deployment beneath the sea surface.

6. A method as claimed in claim 1, wherein the equipment comprises:
   support equipment which supports the weight of the conduits during said paying out step; and
   a binding apparatus to perform said binding of the conduits; and wherein the binding apparatus is mounted on the vessel downstream of the support equipment.

7. A method as claimed in claim 6, wherein:

the binding apparatus is mounted within a vertical laying tower.

8. A method as claimed in claim 6, wherein:

the binding apparatus is mounted within a tiltable laying tower.

9. A method as claimed in claim 6, wherein:

the binding apparatus is mounted within a stinger.

10. A method as claimed in claim 6, wherein:

the binding apparatus has more than one rotary spool carrier.

11. A method as claimed in claim 10, wherein:

each of the more than one spool carrier is arranged for powered movement around an axis of the conduits.

12. A method as claimed in claim 10, wherein:

guide means are provided between the more than one spool carrier and the axis of the conduits, for impinging on a non-adhesive surface of the tape.

13. A method as claimed in claim 10, wherein:

the tape is drawn automatically from the more than one spool carrier by rotation of the more than one spool carrier and by the axial progression of the conduit during laying.

14. A method as claimed in claim 10, wherein:

the binding apparatus includes adjustable conduit guides located upstream and downstream of the location of tape winding for centering said conduit in the apparatus.

15. A method as claimed in claim 14, wherein:

the conduit guides and the arrangement of the more than one spool carrier about the axis of the conduit to be laid are made openable.

16. A method as claimed in claim 14, wherein:

the conduit guides are mounted so as not to rotate with the more than one spool carrier.

17. A method as claimed in claim 6, wherein:

the binding apparatus is mounted permanently in a laying arrangement, to be retracted when not in use and to be deployed about the axis of the conduit being laid as required.

18. An apparatus for laving conduits sub-sea, the apparatus including at least one carrier for a tape spool, arranged for the spool to rotate while moving bodily around the conduits during laying beneath the sea surface and said apparatus is mounted on a laying vessel downstream of equipment which supports the weight of the conduit during paying out of the conduits, wherein guide means are provided between the spool carrier and the axis of the article for impinging on a non-adhesive surface of the tape, and wherein the guide means and the rotary arrangement of the spool carrier about the axis of the conduits to be laid are made openable.

19. An apparatus for laving conduits sub-sea, the apparatus including at least one carrier for a tape spool, arranged for the spool to rotate while moving bodily around the conduits during laying beneath the sea surface and said apparatus is mounted on a laying vessel downstream of equipment which supports the weight of the conduit during paying out of the conduits, and wherein the apparatus is mounted permanently in a laying arrangement, to be retracted when not in use, and to be deployed about the axis of the conduit being laid as required.

20. An apparatus for laying conduits sub-sea, the apparatus including at least one carrier for a tape spool, arranged for the spool to rotate while moving bodily around the conduits during laying beneath the sea surface and said apparatus is mounted on a laying vessel downstream of equipment which supports the weight of the conduit during paving out of the conduits, and wherein the apparatus is mounted permanently in a laying tower, to be retracted when not in use, and to be deployed about the axis of the conduit being laid as required.

21. A method for binding together a plurality of conduits during subsea laying, comprising:

providing a sea-going vessel including means for storing a plurality of conduits, the vessel including conduit support equipment and a binding apparatus having more than one rotary spool carrier to carry flexible adhesive tape;

positioning the vessel at sea;

loading the plurality of conduits into the support equipment;

advancing the plurality of conduits into the binding apparatus;

binding the plurality of conduits using the binding apparatus which binds the plurality of conduits using the flexible adhesive tape, wherein the tape is drawn automatically from the spool carriers by rotation of the spool carriers turning in response to the axial progression of the conduits during laying.

22. The method as claimed in claim 21, wherein:

the apparatus is mounted permanently in a laying arrangement, to be retracted when not in use, and to be deployed about the axis of the conduits being laid as required.

23. The method as claimed in claim 21, wherein:

the plurality of conduits includes a conduit formed of metal with non-metallic coating.

24. The method as claimed in claim 21, further comprising the step of:

attaching insulation to the plurality of conduits during said binding step.

25. The method as claimed in claim 21, further comprising the step of:

attaching buoyant material to the plurality of conduits during said binding step.

* * * * *

UNITED STATES PATENT AND TRADEMARK OFFICE
CERTIFICATE OF CORRECTION

PATENT NO. : 6,641,330 B1
DATED : November 4, 2003
INVENTOR(S) : Andersen et al.

It is certified that error appears in the above-identified patent and that said Letters Patent is hereby corrected as shown below:

Column 7,
Line 45, change "laving" to -- laying -- therein.

Column 8,
Line 1, change "laving" to -- laying -- therein.
Line 17, change "paving" to -- paying -- therein.
Line 22, change "subsea" to -- sub-sea -- therein.

Signed and Sealed this

Thirteenth Day of January, 2004

JON W. DUDAS
*Acting Director of the United States Patent and Trademark Office*